UNITED STATES PATENT OFFICE.

GEORGE H. HULL, OF CRANSTON, RHODE ISLAND, ASSIGNOR, BY DIRECT AND MESNE ASSIGNMENTS, TO CHADELOID CHEMICAL COMPANY, OF NEW YORK, N. Y., A CORPORATION OF WEST VIRGINIA.

COMPOSITION OF MATTER FOR THE REMOVAL OF PAINT, VARNISH, AND THE LIKE.

No. 897,862.     Specification of Letters Patent.     Patented Sept. 1, 1908.

Application filed January 29, 1907. Serial No. 354,754.

*To all whom it may concern:*

Be it known that I, GEORGE H. HULL, a citizen of the United States, residing at Cranston, Providence county, State of Rhode Island, have invented certain new and useful Improvements in Compositions of Matter for the Removal of Paint, Varnish, and the Like, of which the following is a specification.

This invention relates to certain new and useful improvements in compositions of matter for removal of paint, varnish and the like, and it has for its object the production of a composition of this character which is exceedingly simple and cheap in manufacture, and which when applied to a paint or varnish coated surface will cause the paint or varnish to soften to such a consistency as to readily permit the removal thereof.

In carrying out my invention I employ the following ingredients combined in the proportions stated, although the proportions may be varied without departing from the spirit of my invention, to wit:—

Cyanid of potassium _____ 1 pound.
Oxalic acid _____ 2 pounds.
Whiting (commercial calcium carbonate) _____ 3 pounds.
Wood alcohol _____ 1 quart.
Water, substantially pure __ 3 quarts.
Oil of sassafras _____ 2 fluid ounces.

These ingredients are to be thoroughly mixed by agitation.

The cyanid of potassium is first mixed in one quart of hot water (212° Fah.) until it comes to dissolution. The oxalic acid is then mixed in two quarts of hot water (212° Fah.) until it comes to dissolution. After said ingredients have been so dissolved to a liquid state, they are poured into a vessel and agitated until both liquids are thoroughly mixed together. Next, the whiting (commercial calcium carbonate) is floated in cold water until it becomes saturated to the consistency of paste, after which this floating portion of the paste mixture is added to the mixed solution of cyanid of potassium and oxalic acid, and the whole mixture is then agitated until all effervescence ceases. The various ingredients, by their reactions produce calcium oxalate and a limited quantity of calcium cyanid.

In order to remove the obnoxious odor of the composition a deodorizing agent may be employed. For this purpose I dissolve the oil of sassafras in the wood alcohol and add the same to the above described mixture.

In practice when it is desired to merely clean a painted or varnished surface, the latter may be wiped off with a cloth saturated with my improved solution, thereby completely removing the dirt from said surface and leaving the same clean and fresh. When it is desired to renew the finish of a surface the composition is applied and allowed to remain a short time but is removed just before complete dissolution has taken place, remaining just long enough to allow the varnish to soften and flow, whereupon it can be respread to cover marks, and the like. When it is desired to entirely remove the paint or varnish and expose the natural surface, the preparation is applied and allowed to stand a greater length of time, after which the paint or varnish can be scraped or brushed off leaving the surface entirely exposed and in condition to be refinished.

An essential feature of my improved composition is that the same will not in any manner injure or discolor the surface to which applied, and may be safely used upon any painted or varnished surface, such for instance, as in the refinishing of furniture, interior decorations, the spars and hulls of vessels, as well as on the interior and exterior walls of buildings, whether the same be of wood, metal, or other material to which paint or varnish may have been applied.

I claim as my invention:—

1. A composition for the purpose described obtained by mixing cyanid of potassium, oxalic acid and commercial calcium carbonate, whereby calcium oxalate and calcium cyanid are produced.

2. A composition for the purpose described obtained by mixing cyanid of potassium, oxalic acid, and commercial calcium carbonate, whereby calcium oxalate and calcium cyanid are produced, and the subsequent addition of alcohol.

In testimony whereof I affix my signature in presence of two witnesses.

GEORGE H. HULL.

Witnesses:
    BRIAN DUNNE,
    S. H. MANNING.